United States Patent Office 3,650,999
Patented Mar. 21, 1972

3,650,999
POLY(ESTER-AMIDE) BLOCK COPOLYMER HOT MELT ADHESIVES
Joseph G. Martins, Ludlow, and Kenneth F. Ashley, Westfield, Mass., assignors to Monsanto Company, St. Louis, Mo.
No Drawing. Filed June 15, 1970, Ser. No. 46,490
Int. Cl. C08g 41/04; C09j 3/14
U.S. Cl. 260—22 D
20 Claims

ABSTRACT OF THE DISCLOSURE

An adhesive composition is prepared by reacting a crystalline polyester, a $C_{18}$ to $C_{54}$ polycarboxylic acid and a primary diamine to form a poly(ester-amide) adhesive composition. This composition which is especially suited for use as a hot melt adhesive, provides adhesive bonds which are resistant to flow at 150° C.

BACKGROUND OF THE INVENTION (1) Field of the invention

The present invention relates to a composition and method for bonding adjacent surfaces to one another by means of a synthetic resin adhesive and more particularly refers to a composition and method of forming high-strength bonds using a poly(ester-amide) adhesive which affords an adhesive joint with greatly improved properties.

(2) Description of the prior art

Hot melt adhesives are well known in the prior art. These materials are conveniently applied to a substrate in the molten state and upon cooling form an adhesive bond. However, a deficiency common to most of the hot melt adhesives of the prior art is their tendency to soften and flow at elevated temperatures, as, for example, 70 to 100° C. with a resulting loss of bond strength. Consequently, these materials are not suitable for use over a broad temperature range.

Attempts to upgrade the softening and flow temperatures have involved using very high molecular weight resinous materials and/or crosslinking of the resin. These methods have resulted in materials with higher softening points and flow temperatures. However, in most cases the resulting material was not adapted to thermal processing because of its higher molecular weight and/or crosslinked structure resulting in extremely high application viscosity. Thus, these materials were not suitable for use as hot melt adhesives.

A definite need exists in the art for a hot melt adhesive which is resistant to flow at temperatures around 150° C. but which can be readily processed and applied using hot melt adhesive application techniques and apparatus.

SUMMARY OF THE INVENTION

The deficiencies of the prior art have been overcome by the adhesive compositions of the present invention wherein a poly(ester-amide) resin having improved adhesion is obtained by reacting a crystalline polyester, a $C_{18}$ to $C_{54}$ polycarboxylic acid and a primary diamine.

By utilizing the proper selection of structural units, the present invention provides polymeric materials which are capable of being made to flow at elevated temperatures for application purposes but then can develop excellent adhesion to a variety of substrates such as steel, aluminum, wood and plastic substrates. These adhesive materials have resistance to flow at 150° C. under stress and as such represent a significant advance over the adhesive compositions of the prior art.

By the proper selection of reactants and by utilizing specific special polymerization technqiues, crystallizable polyester blocks and non-crystallizable or weakly crystallizable polyamide blocks are built into the resulting poly(ester-amide). Thus, good melt flow characteristics are achieved in the poly(ester-amide) while retaining excellent bond strengths and creep resistance. These compositions represent a significant advance over the hot melt adhesives of the prior art.

DESCRIPTION OF THE PREFERRED EMBODIMENTS

The poly(ester-amide) adhesive compositions of the present invention are prepared by reacting a polyester, a $C_{18}$ to $C_{54}$ polycarboxylic acid and a primary diamine so as to obtain a poly(ester-amide) with a crystalline melting point above 150° C.

The polyester reactant is considered to be a prepolymer in view of the fact that it copolymerizes with the other reactants to form a block copolymer. The polyester must be capable of contributing a crystalline structure to the resulting poly(ester-amide) as is evidenced by a crystalline melting point as determined by differential thermal analysis (DTA) and/or differential scanning calorimetry (DSC) methods. Moreover, the polyester should have a melting point higher than 180° C. and preferably in the range of from 200 to 270° C. and an inherent viscosity in the range of from 0.05 to 0.70 when measured as a 0.5 gram solution of polyester in 100 ml. of a 60/40 phenol/tetrachloroethane solvent pair at 25° C.

The ability of the polyester reactant to contribute a crystalline structure to the resulting poly(ester-amide) is important in order to obtain the desired tensile and modulus properties for hot melt adhesive applications.

It is well known in polymer science that the tensile properties of a polymer can also be increased by increasing the molecular weight of the polymer. This is accomplished by forming longer polymer chains or by forming intractable tri-dimensional structures through cross-linking. These two methods are undesirable in regard to hot melt adhesive compositions because increasing molecular weight causes a corresponding increase in the bulk viscosity of the polymer. Consequently, normal hot melt processing techniques are unsuitable and powerful devices such as extruders are required for processing the polymer. This severely limits the utility of the resulting compositions. Increasing the molecular weight of the polymer by forming tri-dimensional structural linkages gives rise to other related problems. The resulting polymer becomes intractable and resistant to flow and thereby unsuitable for hot melt adhesive applications.

The present invention uses a polyester reactant that contributes crystalline blocks to the resulting poly(ester-amide) hot melt adhesive composition. Consequently, optimum bulk stage physical properties such as tensile and high modulus are achieved without occurring the disadvantage of a high processing viscosity.

An inherent viscosity of from 0.05 to 0.70 is required for the polyester in order to insure that the polyester will contribute the optimum crystalline structure to the final polymeric product. Polyesters with an intrinsic viscosity below 0.05 have a short chain length and cannot contribute the necessary crystalline structure to the final polymeric product which also comprises amorphous polyamide blocks. Inherent viscosities greater than about 0.70 require excessive reaction times or temperatures to form homogenous poly(ester-amides). Thus, it is impractical to use polyester reactants with intrinsic viscosities greater than 0.70 in the practice of the present invention. Moreover, excessive reaction times and temperatures tend to cause degradation of the polymer and a subsequent loss in adhesive properties.

The minimum melting point requirement of about 180° C. for the polyester reactant is necessary in order to insure that the final polymeric product has excellent thermal properties such as resistance to flow at elevated temperatures. Preferably, the melting point of the polyester is in the range of from 200° C. to 270° C.

Representative examples of high melting crystalline polyesters suitable for use in the present invention include polymeric ethylene terephthalate, neopentyl terephthalate, ethylene 2,6-naphthalate, tetramethylene terephthalate, tetramethylene 2,6-naphthalate, trimethylene 2,6-naphthalate, 1,4-cyclohexylene dimethylene terephthalate, and copolyesters, such as copolyesters of ethylene terephthalate containing at least 50 mol percent of ethylene terephthalate, such as 95/5, 90/10, 85/15 and 50/50 ethylene terephthalate-ethylene isophthalate copolyesters, ethylene terephthalate-ethylene adipate copolyesters, and ethylene terephthalate-ethylene hexahydroterephthalate copolyesters, tetramethylene terephthalate-tetramethylene azelate copolyesters containing at least 80 mol percent of tetramethylene terephthalate, 1,4-cyclohexylene dimethylene terephthalate-azelate copolyesters containing 70 to 90 mol percent of 1,4-cyclohexylene dimethylene terephthalate, copolyesters of ethylene 2,5- and 2,6-naphthalate containing from 80 to 90 mol percent of the ethylene naphthalate, such as ethylene 2,5-naphthalate-ethylene azelate and ethylene 2,6-naphthalate-ethylene azelate copolyesters. These polyester blocks can be derived from various dicarboxylic acids and various glycols. Representative examples of such acids are terephthalic acid, isophthalic acid, hexahydroterephthalic acid, the naphthalic acids, such as 2,6-, 2,7- 2,8-, 1,5- and 1,4-naphthalene dicarboxylic acids and other such acids which form high melting polyester resins. Examples of glycols are ethylene glycol, propylene glycol, tetramethylene glycol, neopentyl glycol, 1,4-cyclohexane diol, 1,4-cyclohexane dimethanol and other such glycols. High melting polymers containing components such as 2,2-dimethyl propane diol, form polyesters which have melting points above 234° C. Mixtures of the foregoing polyesters can also be used.

Preferably, a polyester from the following group is used to prepare the adhesive composition of the present invention.

Poly(ethylene terephthalate/isophthalate), 100/0 to 75/25;
Poly(ethylene/hexamethylene terephthalate), 100/0 to 75/25;
Poly(ethylene/neopentyl terephthalate), 100/0 to 75/25;
Poly(tetramethylene terephthalate/isophthalate), 100/0 to 75/25;
Poly(tetramethylene/hexamethylene terephthalate), 100/0 to 75/25;
Poly(tetramethylene/neopentyl terephthalate), 100/0 to 75/25;
Poly(ethylene/propylene terephthalate), 100/0 to 60/40; and
Poly(tetramethylene - 2,6 - naphthalate/tetraphthalate), 100/0 to 75/25; etc.

The amide portion of the polyester-amide adhesive compositions of this invention are amorphous block segments which contribute wettability, elasticity and rubber character to the adhesive composition. The polyamide portion of the polyester-amide compositions of the present invention is the reaction product of a $C_{18}$ to $C_{54}$ polycarboxylic acid and an aliphatic primary diamine. The polycarboxylic acids are well known in the art and are described in detail in U.S. Pat. 3,157,681 and other references. These materials are available commercially as mixtures of monobasic, dibasic and tribasic acid with the dibasic acid being present as the major component of the mixtures. These materials generally have a composition as follows:

| | Percent by wt. |
|---|---|
| $C_{18}$ monobasic acids (monoacids) | 0–10 |
| $C_{36}$ dibasic acids (dimer acids) | 80–100 |
| $C_{54}$ and higher polybasic acids (trimer acids) | 0–10 |

The relative ratios of monomer, dimer and trimer in such unfractionated polymeric fat acids are dependent on the nature of the starting materials and the conditions of polymerization. For the purposes of this invention, the term polycarboxylic also includes mixtures of the mono, di, and tribasic acids.

The aliphatic primary diamines used in this invention contain from 2 to 10 carbon atoms. These include ethylene diamine, 1,3-propane diamine, 1,4-butanediamine, 1,5-pentane diamine, hexamethylene diamine, 1,10-decanediamine, cyclohexyldiamine, 2,2-dimethyl-1,3-propane diamine, etc.

Optionally from 1 to 60% by weight of a linear aliphatic dibasic acid having from 4 to 10 carbon atoms may be substituted for a corresponding amount of the $C_{18}$ to $C_{54}$ polycarboxylic acid used to prepare this portion of the polyester-amide. Examples of these acids would include oxalic, malonic, succinic, glutaric, adipic, pimelic, suberic, azelaic, and sebacic acids. The advantage of substituting the $C_4$ to $C_{10}$ acids for the $C_{18}$ to $C_{54}$ acids is to permit more heterogenous character to the polyamide portion of the polymer in those applications where a more heterogenous character is desired.

The block copolymers of the present invention contain 30 to 70% by weight of polyamide segment and correspondingly, from 30 to 70% by weight of crystalline polyester segments. Preferably, block copolymers of the present invention contain 40 to 60% by weight of polyamide segment and correspondingly, from 60 to 40% of crystalline polyester segments. The poly(ester-amide) compositions of the present invention are further characterized as having an inherent viscosity in the range of from 0.35 to 0.95 and more preferably from 0.40 to 0.6 when measured as a 0.5 gram solution of poly(ester-amide) in 100 ml. of a 60/40 phenol/tetrachloroethane solvent pair at 25° C. The crystalline melting point of these materials as measured by DTA or DSC is in the range of from 155° C. to 225° C. and the melt viscosity at 220° C. is in the range of from 5000 to 65,000 centipoises. The poly(ester-amide) resins are soluble in a 60/40 phenol/tetrachloroethane solvent pair and insoluble in a 1/1 toluene/isopropanol solvent pair. Moreover, the 1/1 toluene/isopropanol extractable content of the poly(ester-amide) resins is less than 2%. In view of the fact that the polyamide portion is soluble in toluene/isopropanol solvent pair the very low order of extractables for the poly(ester-amide) resins demonstrates that they are true block copolymers and not physical blends of polyester and polyamide segments.

The poly(ester-amide) is prepared by a one step or two step method. In the one step method the acid and amine components, which go to form the polyamide segment are polymerized in the presence of the crystalline polyester prepolymer. In the two step method, the polyamide and polyester prepolymer segments are prepared separately and then reacted together to form the polyester-amide. These methods are discussed in greater detail in the working examples set forth below.

The following examples are set forth in illustration of this invention and should not be construed as a limitation thereof. Unless otherwise indicated all parts and percentages are by weight.

EXAMPLE 1

This example illustrates the preparation of an adhesive composition comprising a block copolymer which is approximately 30% by weight of crystalline polyester segments and 70% by weight of amorphous polyamide segments. A pressure reaction vessel equipped with heating and agitation means is charged with 240 parts (0.414 mol) of a $C_{36}$ dicarboxylic acid (from Emery Chemical Co.) and 45 parts (0.387 mol) of 1,6-hexane diamine. The vessel is flushed with nitrogen and the foregoing ingredients are reacted while maintaining agitation for one hour at 200° C. under a nitrogen blanket to form a polyamide resin. At the end of this time the autogenous pressure is reduced and the vessel is swept with nitrogen. No attempt is made to isolate the polyamide.

Then 116.1 parts of a crystalline polyethylene terephthalate (M.P.=260° C.) having an inherent viscosity of 0.147 and 12.4 parts (0.20 mol) of ethylene glycol is charged to the vessel. The reaction mixture is then heated to 260° C. over a period of one hour. After this time the vessel is vented and the pressure is reduced over a 20 minute period while vacuum is being applied. The reaction is then continued under full vacuum (0.1 to 5.0 mm. of mercury) for 4 hours at 260° C. At the end of this time the resulting poly(amide-ester) in molten form (190 to 200° C.) is dicharged under nitrogen pressure into a water bath which quenches the material. The polymer obtained is tested and the results are tabulated in Table I below.

EXAMPLE 2

This example illustrates the preparation of an adhesive composition comprising a block copolymer which is approximately 60% by weight crystalline polyester segments and 40% by weight amorphous polyamide segments. In this example 157.5 parts (0.272 mol) of a $C_{36}$ dibasic acid and 30.8 parts (0.266 mol) of 1,6-hexane diamine are charged to a reaction vessel and heated with agitation at about 215° C. for one hour to form a polyamide resin. During the first 30 minutes the pressure rises to 150 p.s.i. after which time the reaction vessel is vented to reduce the pressure to 90 p.s.i. At the end of one hour the pressure is released and 269 parts of a crystalline polyethylene terephthalate (M.P.=260° C./inherent viscosity 0.147) and 5.9 parts (0.095 mol) of ethylene glycol are charged to the vessel along with a minor amount of an antioxidant. The vessel is flushed with nitrogen and the mixture is heated to about 280° C. while maintaining a nitrogen pressure of 40 p.s.i. After 0.5 hour the vessel is vented and vacuum applied and the reaction is continued under full vacuum (0.1 to 5 mm. of mercury) for two hours. At the end of this time the resulting molten poly(ester-amide) is discharged under pressure into a water bath to quench the material. The polymer obtained is tested and the results are tabulated in Table I below.

EXAMPLE 3

This example illustrates a one step process for preparing a poly(ester-amide) which contains 60% of polyester segments and 40% of polyamide segments.

The following materials are charged to the reaction vessel in the order indicated.

157.5 parts (0.272 mol) of a $C_{36}$ dibasic acid
269.0 parts of a crystalline terephthalate (M.P.=264° C./ inherent viscosity 0.156)
0.64 part of an antioxidant
30.8 parts (.266 mol) of 1,6-hexane diamine The reaction vessel is pressured with nitrogen and then evacuated. This process is repeated twice and then the temperature is raised to 210° C. over a period of one hour under a nitrogen sweep wherein the condensate is collected. At this time 5.9 parts of ethylene glycol (0.095 mol) is charged to the vessel, which is pressured with nitrogen to 60 p.s.i. The reaction vessel is then heated to a temperature of 265° C. and reacted for 70 minutes. After this time pressure is released, vacuum of 6.2 millimeters is applied and the reaction is continued for four hours. The product is then discharged into water as in Example 1 above. The polymer obtained is tested and the results are tabulated in Table I below.

EXAMPLE 4

Example 3 is repeated here except that the inherent viscosity of the crystalline polyethylene terephthalate component is 0.09. The test results for this polymer are listed in Table I below.

EXAMPLE 5

This example illustrates the use of an amorphous copolyamide prepared from a $C_{36}$ dibasic acid, sebacic acid and 1,6-hexane diamine. The resulting poly(ester-amide) contains 30% by weight of polyester segments and 70% by weight of poly-co-amide segments. The following materials are charged to the reaction vessel in the order indicated.

139.1 parts (0.240 mol) $C_{36}$ dibasic acid
67.3 parts (0.579 mol) 1,6-hexane diamine
76.3 parts (0.378 mol) sebacic acid The ingredients in this charge are reacted for one hour at a temperature of 210° C. and then the pressure is reduced over a period of 30 minutes. A nitrogen sweep is maintained for 10 minutes and then 113 parts of a crystalline polyethylene terephthalate (M.P.=264° C./inherent viscosity 0.165) and 5.0 parts (0.08 mol) of ethylene glycol are charged to the vessel. This total charge is heated at 265° C. for one hour. Then the pressure is reduced over a period of 15 minutes and 80 mm. vacuum is applied. The reactants are then heated at 265° C. under full vacuum for 2½ hours. The resulting poly(ester-amide) is then discharged into water. The test results for this polymer are tabulated in Table I below.

EXAMPLE 6

This example illustrates a two-step method for preparing a poly(ester-amide). The resulting poly(ester-amide) contains 60% by weight of polyester segments and 40% by weight of poly-co-amide segments.

Initially 124.2 parts of $C_{36}$ dibasic acid (0.215 mol), 21.6 parts of sebacic acid (0.107 mol) and 38.5 parts of 1,6-hexane diamine (0.331 mol) are mixed under 15 lbs. of nitrogen pressure and heated to a temperature of 218° C. over a period of one hour. After this time the pressure is released and the condensate collected. The vessel is cooled to 145° C. and a charge of 5.9 parts of ethylene glycol (0.095 mol) and 269.0 parts of a crystalline polyethylene terepthalate (M.P.=264° C./inherent viscosity of 0.165) is added to the reaction vessel. The mixture is then heated to 265° C. over a period of ½ hour and maintained at this temperature for 3 hours under vacuum, cooled to 180° C. and discharged as above. The test results for this polymer are tabulated in Table I below.

EXAMPLE 7 (CONTROL)

This example illustrates the preparation of an adhesive composition comprising a block copolymer which is approximately 60% by weight of a crystalline polyester and 40% by weight of polyamide. The polyester used in the preparation of this poly(ester-amide) has an inherent viscosity of 0.782 which is higher than the 0.70 maximum specified for use in the present invention. In this example 112.5 parts (0.194 mol) of $C_{36}$ dibasic acid and 22.0 parts (0.19 mol) of 1,6-hexane diamine are charged to a reaction vessel, flushed with nitrogen and heated at 212° C. for 70 minutes. During this time the pressure rises to 135 p.s.i. The vessel is then vented to about 100 p.s.i. and heating is continued for an additional hour after which time the reaction vessel is swept with nitrogen and the temperature is reduced to 185° C. At this point 192.0 parts of a polyethylene terephthalate polyester (M.P.=260° C./inherent viscosity 0.782) plus 4.2 parts (0.068 mol) of ethylene glycol are charged to the reactor, swept with nitrogen and then heated at 268–270° C. for 2½ hours. Vacuum is then applied (0.1–5 mm.) for 2 hours. At the end of this time the resultant molten poly(ester-amide) is discharged under pressure into water to quench the material. The test results for this polymer are tabulated in Table I below.

fail the creep resistance test (150° C.) in less than one hour. Two other products withstood 168 hours in the creep

TABLE I.—SUMMARY OF PROPERTIES OF POLY(ESTER-AMIDE) RESINS OF EXAMPLES 1 TO 7

|  | Example | | | | | | |
|---|---|---|---|---|---|---|---|
|  | 1 | 2 | 3 | 4 | 5 | 6 | 7 |
| Tensile strength (p.s.i.) | 750 | 3,300 | 3,000 | 3,100 | 1,600 | 2,800 | 3,900 |
| Percent elongation | 490 | 370 | 300 | 500 | 450 | 310 | 290 |
| Inherent viscosity | 0.75 | 0.68 | 0.61 | 0.59 | 0.89 | 0.67 | 0.79 |
| Crystalline M.P., °C | 174 | 185 | 205 | 155 | 168 | 196 | 185 |
| Bond strength (p.s.i.):[1] | | | | | | | |
| Steel/steel | 985 | 1,620 | 2,300 | 1,700 | 1,410 | 2,340 | 1,590 |
| Aluminum/aluminum | 1,140 | [2]1,620 | 1,800 | 1,760 | 1,560 | 2,040 | 1,660 |
| Creep resistance (hours)[3] | >192 | >192 | >174 | >174 | >186 | 168 | <1/60 |
| Percent extractables (toluene/isopropanol) | <1 | <1 | <1 | <1 | <1 | <1 | |

[1] Bond strength, determined using a 1 x 0.5 inch lap bond. Samples conditioned 48 hours at 50% R.H. and 23° C.
[2] Aluminum failure.
[3] Creep resistance, determined using a 1 x 1 inch lap bond on carbon steel. Samples prepared and then suspended in an oven (25° C.), a 5 lb. load is attached and the temperature of the oven is raised to 150° C. and the time to bond failure is measured from the time the temperature reaches 150° C.

EXAMPLE 8 (CONTROL)

This example illustrates the poor results obtained when using an aromatic acid in the amide segment of the poly (ester-amide). A charge of 91.7 parts (0.33 mol) of a $C_{36}$ dibasic acid and 97.7 parts (0.6 mol) of isophthalic acid and 55.2 parts (0.9 mol) of ethylene diamine are charged into a reactor, flushed with nitrogen as above and reacted at 200° C. for 45 minutes. After this time the reaction temperature is raised to 250° C. and reacted for 2 hours. The molten prepolymer is then discharged as above and found to lack homogeneity. Upon extraction with suitable solvents only partial solubilities could be achieved and the product is not suitable for further condensation with the polyester. Consequently, no test results are available.

The data for Examples 1 to 6 in the foregoing table clearly illustrate the improved properties of the poly(ester-amide) hot melt compositions of the present invention. Note the excellent bond strength and creep resistance which is obtained with these materials. In addition, all of the resins prepared in Examples 1 to 6 have melt viscosities at 220° C. in the range of from 7000 to 41,000 centipoises which allows for easy thermal processing. The low percent extractables (1/1 toluene/isopropanol solvent pair) indicates that the polymeric compoistions are true block copolymers and not merely physical blends. The suitability of these materials for use as hot melt adhesives for applications requiring high temperature resistance is clearly indicated by the foregoing properties.

Example 7 which was prepared using a polyester with an inherent viscosity outside the range specified in the present invention failed the creep resistance test in less than one minute thereby indicating its unsuitability for use as a high temperature resistant hot melt adhesive.

EXAMPLE 9 (CONTROL)

A series of six commercially available nylon type polyamide hot melt adhesives are tested. Four of the products resistance test. However, these materials have a melt viscosity of 190,000 centipoises at 232° C. This high melt viscosity makes these materials unacceptable for use in normal hot melt adhesive applications.

EXAMPLE 10 (CONTROL)

A series of five commercially available polyamide adhesives prepared from a dibasic acid and a diamine are tested for creep resistance at 150° C. All of these materials fail to last even one hour in the creep resistance test at 150° C.

EXAMPLE 11 (CONTROL)

A series of three commercially available polyamide adhesives prepared from $C_{36}$ dibasic acids and a diamine are tested for creep resistance at 150° C. These materials fail the 150° C. creep resistance test in less than one hour. Furthermore, these materials are characterized by having very low elongation (<60%) and poor bond strength.

EXAMPLE 12 (CONTROL)

A commercially available hot melt adhesive based on an ethylene/vinyl alcohol copolymer is tested for creep resistance at 150° C. The test samples fail before the oven temperature reaches 150° C. which marks the start of the test.

EXAMPLES 13 TO 19

The following examples illustrate some of the variations possible in the polyester-prepolymer component used to prepare the hot melt compositions of the present invention. In each example the polyamide segments are prepared from a $C_{36}$ dibasic acid and hexane diamine. The poly(ester-amide) resins, which are prepared according to the procedures outlined in Example 2, have properties comparable to those described in Examples 1 to 6 above. The polyester components used in Examples 13 to 19 are described in the following Table II.

TABLE II.—SUMMARY OF POLYESTERS USED IN EXAMPLES 13 TO 19

| Example | Polyester[1] | Inherent viscosity[2] | M.P.[3] | Ratio PE/PA[4] |
|---|---|---|---|---|
| 13 | Terephthalic-tetramethylene glycol | 0.5 | 226 | 1.00 |
| 14 | Co-poly(ethylene terephthalate) (propylene terephthalate) | 0.29 | 225 | 1.00 |
| 15 | Bis(p-Carboxyphenyl)methane-ethylene glycol | 0.37 | 320 | 1.33 |
| 16 | Bis 1,2 (p-carboxyphenyl)ethane-ethylene glycol | 0.28 | 212 | 1.33 |
| 17 | Terephthalic-trimethylene glycol | 0.15 | 217 | 1.00 |
| 18 | Co-poly(butylene terephthalate) (ethylene terephthalate) | 0.18 | 222 | 1.00 |
| 19 | Co-poly(ethylene terephthalate) (ethylene isophthalate) | 0.13 | 205 | 1.00 |

[1] In Example 18, the mole ratio of (butylene terephthalate)/(ethylene terephthalate) is 80/20; in Example 19 the mole ratio of (ethylene terephthalate)/(ethylene isophthalate) is 50/50.
[2] Inherent viscosity of polyester prepolymer reactant.
[3] Melting point of polyester prepolymer reactant.
[4] Ratio of polyester to polyamide segments in resulting poly(esteramide).

EXAMPLES 20 TO 29

The following examples illustrate some of the variations possible in the polyamide component used to prepare the hot melt compositions of the present invention. In each example the polyester used is the polyethylene terephthalate used in Example 2. The polyamide segments are prepared from a mixture of a $C_{36}$ dibasic acid, a dicarboxylic acid and a diamine. The resulting poly(ester-amide) resins, which are prepared according to the procedures outlined in Example 5, have properties comparable to those described in Example 5. The components used to prepare the poly(ester-amides) in Examples 20 to 29 are described in the following Table III.

TABLE III.—SUMMARY OF REACTANTS USED TO PREPARE THE POLYAMIDE SEGMENTS OF EXAMPLES 20 TO 29

| Example | Acid | Ratio, $C_{36}$/acid [1] | Diamine | Ratio, PE/PA [2] |
|---|---|---|---|---|
| 20 | Sebacic | 4 | Ethylene | 1.50 |
| 21 | do | 4 | Tetramethylene | 1.00 |
| 22 | Suberic | 4 | do | 1.25 |
| 23 | Adipic | 3 | Hexamethylene | 1.00 |
| 24 | Azelaic | 3 | do | 1.00 |
| 25 | Sebacic | 3 | do | 1.00 |
| 26 | Pimelic | 4 | do | 1.50 |
| 27 | 1,3 di(p-carboxymethylphenyl) propane | 4 | do | 0.75 |
| 28 | Adipic | 5 | Nonamethylene | 1.00 |
| 29 | Sebacic | 5 | Decamethylene | 1.25 |

[1] Ratio of $C_{36}$ dibasic acid to dicarboxylic acid by weight.
[2] Ratio of polyester to polyamide segments in resulting poly(esteramide).

EXAMPLE 30

The following example is set forth to further illustrate the hot melt adhesive compositions of the present invention. Example 1 is repeated here except that the final polymeric product contains 50% by weight of polyester segments and 50% by weight of polyamide segments. This material is further characterized as follows:

Tensile strength—2300 p.s.i.
Percent elongation—450
Inherent viscosity—0.54
Crystalline melting point—174° C.
Bond strength:
  Steel/steel—2000 p.s.i.
  Aluminum/aluminum—1780 p.s.i.
Creep resistance (150° C.)—>190 hours In addition the poly(ester-amide) hot melt composition prepared above is used to bond various other substrates. The substrates and the test results are tabulated in the following Table IV.

TABLE IV.—ADHESION TESTS

| Substrate | Adhesive bond | Adhesive tests [1] |
|---|---|---|
| Leather/leather | Excellent | Leather failure. |
| Poly(acrylonitrile/butadiene/styrene)/aluminum. | do | Poly(acrylonitrile/butadiene/styrene) failure. |
| Cotton cloth/leather | do | Cloth failure. |
| Mylar/Mylar | do | Mylar failure. |

[1] Sample is tested to determine if failure occurs in adhesive or substrate.

The hot melt adhesive compositions of the present invention find wide spreadability wherever hot melt adhesives are used. They are especially valuable in those applications where resistance to creep at elevated temperatures is a necessary requirement. The adhesive compositions of the present invention may be used to great advantage to bond a variety of substrates including metal, glass, synthetic and natural textiles, leathers, synthetic polymeric sheet material, wood, paper, etc.

The present invention also includes the concept of incorporating various ingredients into the poly(ester-amide) resins of the present invention in order to improve processing and/or performance of these materials. These additives and adjuncts include antioxidants, thermal stabilizers, fillers, extenders, dyes, pigments, adhesion promoters, plasticizers, etc.

In view of the foregoing it is obvious that many deviations may be made in the products or processes set forth above without departing from the scope of this invention.

What is claimed is:

1. A poly(ester-amide) block copolymer hot melt adhesive comprising from 30 to 70% by weight of crystalline polyester segments having melting points in the range of from 180° C. to 270° C. and inherent viscosities in the range of from 0.05 to 0.70 when measured as a 0.5 gram solution in 100 milliliters of a 60/40 phenol-tetrachloroethane solvent pair at 25° C.; and from 70 to 30% by weight of amorphous polyamide segments, wherein the polyamide is the reaction product of a $C_{18}$ to $C_{54}$ polycarboxylic acid and an aliphatic primary diamine containing from 2 to 10 carbon atoms; wherein the hot melt adhesive has a crystalline melting point in the range of from 155° C. to 225° C. and an inherent viscosity in the range of from 0.35 to 0.95 when measured as a 0.5 gram solution in 100 ml. of a 60/40 phenol/tetrachloroethane solvent pair at 25° C.

2. A hot melt adhesive as in claim 1 wherein the polyester is selected from the group consisting of poly(ethylene-terephthalate), co-poly(butylene terephthalate)-(ethylene terephthalate), co-poly(ethylene - terephthalate)-(ethylene isophthalate) and co-poly(ethylene terephthalate)-(propylene terephthalate).

3. A hot melt adhesive as in claim 1 wherein the aliphatic diamine is hexane diamine.

4. A hot melt adhesive as in claim 1 having a melt viscosity at 220° C. in the range of from 5000 to 65,000 centipoises.

5. A poly(ester-amide) block copolymer hot melt adhesive comprising from 30 to 70% by weight of crystalline polyester segments having melting points in the range of from 180° C. to 270° C. and inherent viscosities in the range of from 0.05 to 0.70 when measured as a 0.5 gram solution in 100 milliliters of a 60/40 phenol/tetrachloroethane solvent pair at 25° C.; and from 70 to 30% by weight of polyamide segments; wherein the polyester is selected from the group consisting of poly(ethylene terephthalate), co-poly(butylene terephthalate)-(ethylene terephthalate) co-poly(ethylene terephthalate)-(ethylene isophthalate) and co-poly(ethylene terephthalate)-(propylene terephthalate); wherein the polyamide is the reaction product of a $C_{36}$ dibasic acid and an aliphatic diamine containing from 2 to 10 carbon atoms; and wherein the adhesive composition has a crystalline melting point in the range of from 155° C. to 225° C. and an inherent viscosity in the range of from 0.35 to 0.95 when measured as a 0.5 gram solution in 100 ml. of a 60/40 phenol/tetrachloroethane solvent pair at 25° C.

6. A hot melt adhesive as in claim 5 wherein the aliphatic diamine is hexane diamine.

7. A hot melt adhesive as in claim 5 wherein the polyester is poly(ethylene-terephthalate).

8. A hot melt adhesive composition as in claim 5 wherein the polyester is co-poly(butylene terephthalate)-(ethylene terephthalate).

9. A hot melt adhesive composition as in claim 5 wherein the polyester is co-poly(ethylene terephthalate)-(ethylene isophthalate).

10. A hot melt adhesive composition as in claim 5 wherein the polyester is co-poly(ethylene terephthalate)-(propylene terephthalate).

11. An article of manufacture comprising two substrates joined by a poly(ester-amide) block copolymer hot melt adhesive comprising from 30 to 70% by weight of crystalline polyester segments having melting points in the range of from 180° C. to 270° C. and inherent viscosities in the range of from 0.05 to 0.70 when measured as a 0.5 gram solution in 100 milliliters of a 60/40 phenol/tetrachloroethane solvent pair at 25° C.; and from 70 to 30% by weight of amorphous polyamide segments, wherein the polyamide is the reaction product of a $C_{18}$ to $C_{54}$ polycarboxylic acid and an aliphatic primary diamine containing from 2 to 10 carbon atoms; wherein the hot melt adhesive has a crystalline melting point in the range of from 155° C. to 225° C. and an inherent viscosity in the range of from 0.35 to 0.95 when measured as a 0.5 gram solution in 100 ml. of a 60/40 phenol/tetrachloroethane solvent pair at 25° C.

12. An article of manufacture as in claim 11 wherein the polyester in the hot melt adhesive is selected from the group consisting of poly(ethylene-terephthalate), co-poly-(butylene terephthalate)-(ethylene terephthalate) co-poly-(ethylene terephalate)-(ethylene isophthalate) and co-poly(ethylene terephthalate)-(propylene terephthalate).

13. An article of manufacture as in claim 11 wherein the aliphatic diamine used to prepare the polyamide segment of the hot melt adhesive is hexane diamine.

14. An article of manufacture as in claim 11 wherein the hot melt adhesive has a melt viscosity at 220° C. in the range of from 5000 to 65,000 centipoises.

15. An article of manufacture comprising two substrates joined by a poly(ester-amide) block copolymer hot melt adhesive comprising from 30 to 70% by weight of crystalline polyester segments having melting points in the range of from 180° C. to 270° C. and inherent viscosities in the range of from 0.05 to 0.70 when measured as a 0.5 gram solution in 100 milliliters of a 60/40 phenol/tetrachloroethane solvent pair at 25° C.; and from 70 to 30% by weight of polyamide segments; wherein the polyester is selected from the group consisting of poly(ethylene-terephthalate), co - poly(butylene terephthalate)-(ethylene terephthalate) co-poly(ethylene terephthalate)-(ethylene isophthalate) and co-poly(ethylene terephthalate)-(propylene terephthalate); wherein the polyamide is the reaction product of a $C_{36}$ dibasic acid and an aliphatic diamine containing from 2 to 10 carbon atoms; and wherein the adhesive composition has a crystalline melting point in the range of from 155° C. to 225° C. and an inherent viscosity in the range of from 0.35 to 0.95 when measured as a 0.5 gram solution in 100 ml. of a 60/40 phenol/tetrachloroethane solvent pair at 25° C.

16. An article of manufacture as in claim 15 wherein the aliphatic diamine used to prepare the polyamide segment of the hot melt adhesive is hexane diamine.

17. An article of manufacture as in claim 15 wherein the polyester segment of the hot melt adhesive is poly-(ethylene-terephthalate).

18. An article of manufacture as in claim 15 wherein the polyester segment of the hot melt adhesive is co-poly-(butylene terephthalate)-(ethylene terephthalate).

19. An article of manufacture as in claim 15 wherein the polyester segment of the hot melt adhesive is co-poly-(ethylene terephthalate)-(ethylene isophthalate).

20. An article of manufacture as in claim 15 wherein the polyester segment of the hot melt adhesive is co-poly-(ethylene terephthalate)-(propylene terephthalate).

References Cited

UNITED STATES PATENTS

| | | | |
|---|---|---|---|
| 3,378,602 | 4/1968 | Robertson | 260—857 |
| 3,446,778 | 5/1969 | Waller et al. | 260—75 |
| 3,468,975 | 9/1969 | Duxbury et al. | 260—857 |
| 3,475,385 | 10/1969 | Goodman et al. | 260—78 |
| 3,361,593 | 1/1968 | Sattler et al. | 117—218 |
| 3,493,632 | 2/1970 | Okazaki et al. | 260—857 |
| 2,728,737 | 12/1955 | Wittcoff | 117—161 |
| 3,496,059 | 2/1970 | Rasmussen | 161—146 |
| 2,889,292 | 6/1959 | Peerman | 260—22 |
| 3,254,040 | 5/1966 | Aronoff et al. | 260—22 |
| 3,493,544 | 2/1970 | Goodman et al. | 260—78 |

FOREIGN PATENTS

| | | | |
|---|---|---|---|
| 11,668 | 5/1969 | Japan | 260—857 |

DONALD E. CZAJA, Primary Examiner

R. W. GRIFFIN, Assistant Examiner

U.S. Cl. X.R.

117—122 H, 122 PA, 161 P; 161—190, 214; 260—75 N, 857 PE